No. 825,220. PATENTED JULY 3, 1906.
A. W. IRVIN.
HOSE COUPLING.
APPLICATION FILED OCT. 30, 1905.

Witnesses
G. H. Bynul
W. May D. Duvall

Inventor
Alexander W. Irvin,
By Wilkinson & Fisher
Attorneys

UNITED STATES PATENT OFFICE.

ALEXANDER W. IRVIN, OF ALTOONA, PENNSYLVANIA.

HOSE-COUPLING.

No. 825,220.  Specification of Letters Patent.  Patented July 3, 1906.

Application filed October 30, 1905. Serial No. 285,095.

To all whom it may concern:

Be it known that I, ALEXANDER W. IRVIN, a citizen of the United States, residing at Altoona, in the county of Blair and State of Pennsylvania, have invented certain new and useful Improvements in Hose-Couplings; and I do hereby declare the following to be a full, clear, and exact description of the invention, such as will enable others skilled in the art to which it appertains to make and use the same.

My invention relates to improvements in hose-couplings adapted for use with the air or steam systems on railway-trains; and the object of my invention is to produce a device of this character made entirely of metal, thus doing away with the rubber portions ordinarily used in such couplings, which soon deteriorate in actual service, and yet preserving perfect flexibility.

With these objects in view my invention consists in the construction and combinations of parts, as hereinafter described and claimed.

Figure 1:
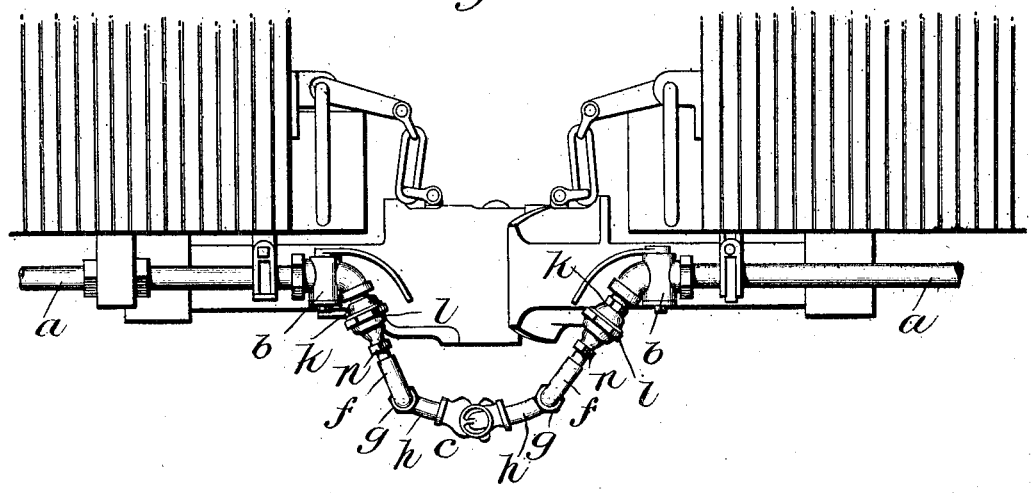
Figure 2:
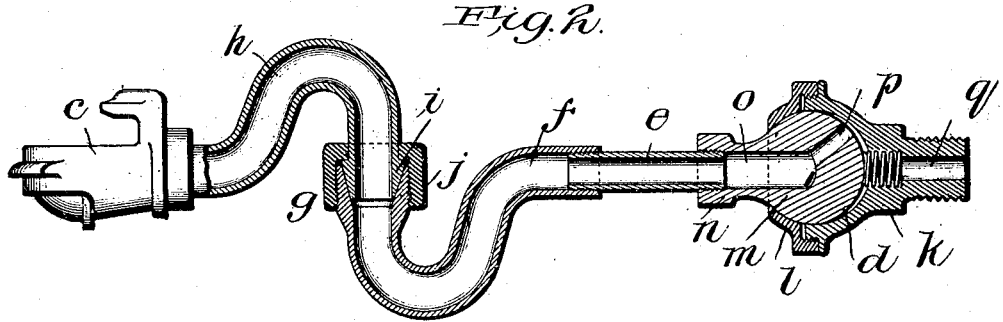
Figure 3:
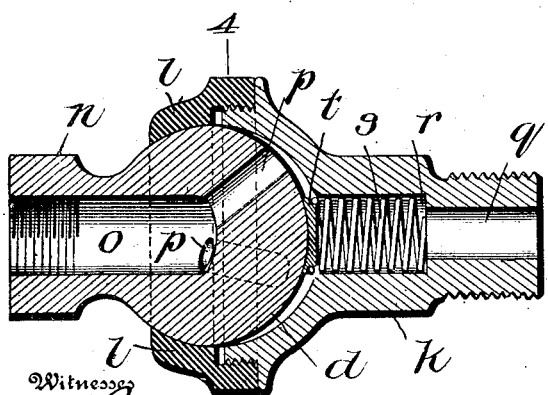
Figure 4:
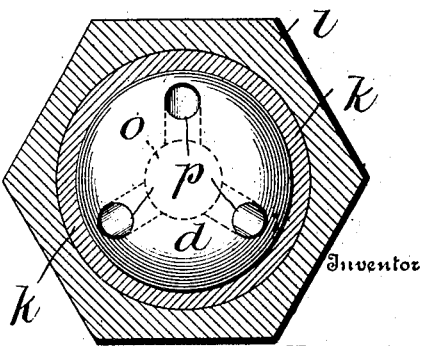

In the accompanying drawings, Figure 1 is a section of a part of two cars, showing my invention applied thereto. Fig. 2 is a central cross-section, partly in elevation, of one-half of my improved coupling. Fig. 3 is a cross-section, on a larger scale, of the ball-and-socket joint; and Fig. 4 is a cross-section on the line 4 4 of Fig. 3.

$a$ represents the air or steam pipes, $b$ the angle-cocks, and $c$ the parts of the coupler-joint, all these parts being of the usual construction. The rubber hose, however, which usually connects the angle-cock with the coupler-joint, is in my invention replaced by a metal construction designed to have somewhat the functions of a human arm—that is to say, to permit perfect flexibility within certain limits.

The connection between one of the angle-cocks $b$ and the corresponding part $c$ of the coupler-joint is made by means of a ball-and-socket joint $d$, a straight pipe $e$, a bent pipe $f$, an elbow-joint $g$, and a bent pipe $h$. (Shown in section in Fig. 2.) One end of the pipe $h$ is coned off, as shown at $i$, fitting in a similar portion in the outwardly-flared end of the pipe $f$, the whole being surrounded by a union-joint $j$, which permits freedom of movement in one plane. A packing (not shown) may be employed inside of the union-joint $j$, if desired. The ball-and-socket joint consists of two socket members $k$ and $l$, screw-threaded together, the part $l$ being annular in shape, but having its interior curved to fit over the ball member of the socket. The ball member M is inserted in the part $k$ and then the part $l$ screwed down, making a complete ball-and-socket joint. One part of the ball-coupling $m$ is extended downward, as shown at $n$, and provided with an internal screw-thread with which the pipe $e$ engages, the construction being such that perfect freedom of movement is obtained within quite wide limits. The pipes $h$, $f$, and $e$ are of course hollow, and the ball member $m$ is provided with a large perforation $o$ and a series of smaller perforations $p$. The part $k$ of the socket member is also perforated, as shown at $q$, for the passage of air or steam. The part $k$ is also provided with a larger perforation $r$ for the reception of a spring $s$, which bears against the bottom of the perforation $r$ and at the other end bears against a washer $t$, resting on the ball member $m$, or, if desired, the washer may be made integral therewith.

It is obvious that each half of the coupling may be moved freely in any direction by means of the ball-and-socket joint and that the parts $c$ of the coupler-joint may be engaged together in the usual way by moving them about the elbow-joints.

Having thus described my invention, what I claim as new, and desire to secure by Letters Patent of the United States, is—

In a hose-coupling the combination with the train-pipes, of couplings therefor each provided with a ball-and-socket joint consisting of a ball member having one large perforation extending from the neck of said member to the center of the ball and one or more smaller perforations extending from and connecting with the larger perforation, two socket members adapted to inclose the ball of said ball member, one of said socket members containing perforations one adapted to contain a spring, a spring adapted to press the ball member away from one of the socket members to form an air-passage from the smaller perforations in said ball member through the larger socket member and a washer interposed between said ball member and said spring, substantially as described.

In testimony whereof I affix my signature in presence of two witnesses.

ALEXANDER W. IRVIN.

Witnesses:
ALBERT MONTGOMERY,
HENRY SNYDER.